United States Patent
Karim et al.

(10) Patent No.: US 10,415,600 B2
(45) Date of Patent: Sep. 17, 2019

(54) TURBOCHARGER COMPRESSOR NOISE REDUCTION SYSTEM AND METHOD

(71) Applicant: Ford Global Technologies, LLC, Dearborn, MI (US)

(72) Inventors: Ahsanul Karim, Canton, MI (US); Brian W. Lizotte, Howell, MI (US); Keith D. Miazgowicz, Dearborn, MI (US); Abdelkrim Zouani, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 484 days.

(21) Appl. No.: 15/235,693

(22) Filed: Aug. 12, 2016

(65) Prior Publication Data
US 2016/0348698 A1    Dec. 1, 2016

Related U.S. Application Data

(63) Continuation of application No. 14/841,391, filed on Aug. 31, 2015, now Pat. No. 9,938,991, which is a
(Continued)

(51) Int. Cl.
*F04D 27/02* (2006.01)
*F04D 29/66* (2006.01)
(Continued)

(52) U.S. Cl.
CPC ............ *F04D 29/663* (2013.01); *F02B 33/40* (2013.01); *F02C 7/045* (2013.01); *F02M 35/12* (2013.01);
(Continued)

(58) Field of Classification Search
CPC .. F04D 27/0246; F04D 29/284; F04D 29/663; F04D 17/10; F04D 27/02;
(Continued)

(56) References Cited

U.S. PATENT DOCUMENTS 4,220,219 A * 9/1980 Flugger ................. F01N 1/04
181/265
4,673,331 A    6/1987 Kolb
(Continued)

FOREIGN PATENT DOCUMENTS

DE    3908285 C1    6/1990
SU    1486067 A3    6/1989

*Primary Examiner* — Aaron R Eastman
(74) *Attorney, Agent, or Firm* — Julia Voutyras; McCoy Russell LLP

(57) ABSTRACT

A turbocharger and a method are disclosed. The turbocharger includes a casing having an inlet end and an outlet end. A flow passage within the casing may have a substantially continuous inner surface and may be configured to pass inlet air from the inlet end to the outlet end. A compressor wheel may be located in the casing and may have at least one main blade and may be configured to rotate within the casing to compress the inlet air. A flow disrupting feature on the casing may be configured to disrupt the continuity of the inner surface and may be located at a leading edge of the at least one main blade. The flow disrupting feature may be closed to upstream communication with the flow passage except via the flow passage.

20 Claims, 8 Drawing Sheets

Related U.S. Application Data continuation of application No. 13/528,622, filed on Jun. 20, 2012, now Pat. No. 9,303,561.

(51) Int. Cl.

| | |
|---|---|
| *F02M 35/12* | (2006.01) |
| *F02C 7/045* | (2006.01) |
| *F04D 29/28* | (2006.01) |
| *F04D 29/40* | (2006.01) |
| *F02B 33/40* | (2006.01) |
| *F04D 17/10* | (2006.01) |
| *F04D 29/42* | (2006.01) |
| *F04D 29/44* | (2006.01) |

(52) U.S. Cl.
CPC ............ *F04D 17/10* (2013.01); *F04D 27/02* (2013.01); *F04D 27/0246* (2013.01); *F04D 29/284* (2013.01); *F04D 29/403* (2013.01); *F04D 29/4206* (2013.01); *F04D 29/4213* (2013.01); *F04D 29/441* (2013.01); *F04D 29/665* (2013.01); *F04D 29/667* (2013.01); *F04D 29/668* (2013.01); *F05D 2220/40* (2013.01); *F05D 2250/51* (2013.01)

(58) Field of Classification Search
CPC .............. F04D 29/403; F04D 29/4206; F04D 29/4213; F04D 29/441; F04D 29/665; F04D 29/667; F04D 29/668; F03B 37/00; F03B 37/11; F03B 37/22; F03B 39/00; F05D 2220/40; F05D 2240/51; F02B 33/40; F02C 7/045; F02M 35/12
USPC .................................. 415/206, 205
See application file for complete search history.

(56) References Cited

U.S. PATENT DOCUMENTS

| | | |
|---|---|---|
| 4,689,959 A | 9/1987 | Houkita et al. |
| 4,944,660 A | 7/1990 | Joco |
| 5,025,629 A | 6/1991 | Woollenweber |
| 6,145,313 A | 11/2000 | Arnold |
| 7,942,625 B2 | 5/2011 | Sirakov et al. |
| 2002/0157396 A1 | 10/2002 | Conicella |
| 2004/0247462 A1 | 12/2004 | Carter |
| 2005/0196272 A1 | 9/2005 | Nikpour |
| 2006/0275113 A1 | 12/2006 | Chen |
| 2007/0217902 A1 | 9/2007 | Sirakov et al. |
| 2007/0266705 A1* | 11/2007 | Wood ............... F02B 37/22 60/599 |
| 2008/0181764 A1 | 7/2008 | Hirakawa et al. |
| 2008/0247870 A1 | 10/2008 | Sirakov et al. |
| 2008/0292449 A1 | 11/2008 | Lefevre |
| 2010/0043761 A1 | 2/2010 | Joergl et al. |
| 2010/0098532 A1 | 4/2010 | Diemer et al. |
| 2010/0129209 A1 | 5/2010 | Sugimoto et al. |
| 2010/0205949 A1 | 8/2010 | Bolda et al. |
| 2010/0221107 A1 | 9/2010 | Anschel et al. |
| 2010/0266395 A1 | 10/2010 | Hermann et al. |
| 2010/0322757 A1 | 12/2010 | Hall et al. |
| 2010/0322778 A1 | 12/2010 | Carroll, III et al. |
| 2011/0131976 A1 | 6/2011 | Kratschmer et al. |
| 2011/0214421 A1 | 9/2011 | Schmitt et al. |

* cited by examiner

TURBOCHARGER COMPRESSOR NOISE REDUCTION SYSTEM AND METHOD

CROSS REFERENCE TO RELATED APPLICATIONS

The present application is a continuation of U.S. patent application Ser. No. 14/841,391, entitled "TURBOCHARGER COMPRESSOR NOISE REDUCTION SYSTEM AND METHOD," filed on Aug. 31, 2015, which is a continuation of U.S. patent application Ser. No. 13/528,622, entitled "TURBOCHARGER COMPRESSOR NOISE REDUCTION SYSTEM AND METHOD," filed on Jun. 20, 2012, now U.S. Pat. No. 9,303,561, the entire contents of each of which are hereby incorporated by reference for all purposes.

FIELD

The present application relates to methods and systems for compressing engine intake air using a boosting system such as a turbocharger, and specifically turbocharger arrangements, methods and systems wherein noise generated by the turbocharger compressor is reduced.

BACKGROUND AND SUMMARY

Vehicle engines may include turbochargers, or superchargers configured to force more air mass into an engine's intake manifold and combustion chamber by compressing intake air with a turbine compressor. In some cases the compressor may be driven by a turbine disposed to capture energy from the flow of the engine exhaust gas. In transient and steady state operation of compressors, there is known Noise Vibration and Harshness (NVH) issues characterized by a whoosh noise, or simply whoosh. The whoosh condition, may cause undesirable or unacceptable levels of NVH, and may also lead to turbocharger/engine surge.

Attempts have been made to mitigate noise from turbocharger compressors. One attempt includes providing small channels to disturb the boundary layer of the incoming flow field to the turbocharger. Another attempt to mitigate turbine noise is disclosed in US Patent publication 2010/0098532 to Diemer et al. Diemer et al. attempts to reduce turbocharger stall noise by providing a groove that straddles the leading edge of the splitter blades of the compressor. The groove is located downstream from the leading edge of the main blades to provide a path for fluid around a rotating stall.

Other attempts to minimize compressor noise have provided various re-circulation passages wherein part of the flow is re-circulated from a downstream position to an upstream position via a passage separate from the main flow passage. One example of such an approach is disclosed in U.S. Pat. No. 7,942,625 to Sirakov et al. Sirakov provides a bleed passage downstream from the blade leading edge that enables a portion of the compressor fluid to re-circulate to an upstream location via an internal cavity and injection passage.

All these approaches fail to investigate the compressor flow path in the area of the main blade leading edge, and all fail to effectively address whoosh noise. In addition, none of these approaches target the broadband frequency range of whoosh noise with minimal effect on the flow field.

Embodiments in accordance with the present disclosure may provide a turbocharger including a casing having an inlet end and an outlet end. A flow passage may be provided within the casing that may have a substantially continuous inner surface and may be configured to pass inlet air from the inlet end to the outlet end. A compressor wheel may be located in the casing having at least one main blade and configured to rotate within the casing to compress the inlet air. A flow disrupting feature may be located on the casing and may be configured to disrupt the continuity of the inner surface. At least a portion of the flow disrupting feature may be located substantially in line with a leading edge of the at least one main blade and may be closed to upstream communication with the flow passage except via the flow passage.

Embodiments in accordance with the present disclosure may include a flow disrupting feature that may include a change in cross sectional area of the flow path that when located at the leading edge of the main blades of the compressor may decrease whoosh. Other embodiments may include a resonance chamber that may be tuned to mitigate certain whoosh frequencies.

Embodiments may include components of a flow disrupting feature that may be sized and proportioned in accordance with a particular mathematical formula which relates the components in a specified way to one or more particular frequencies of whoosh noise. In this way the broad band frequency range defined by whoosh can be targeted, and the whoosh issue reduced or mitigated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-14 are drawn approximately to scale, although other relative ratios may be used, if desired.

DETAILED DESCRIPTION

Figure 1:
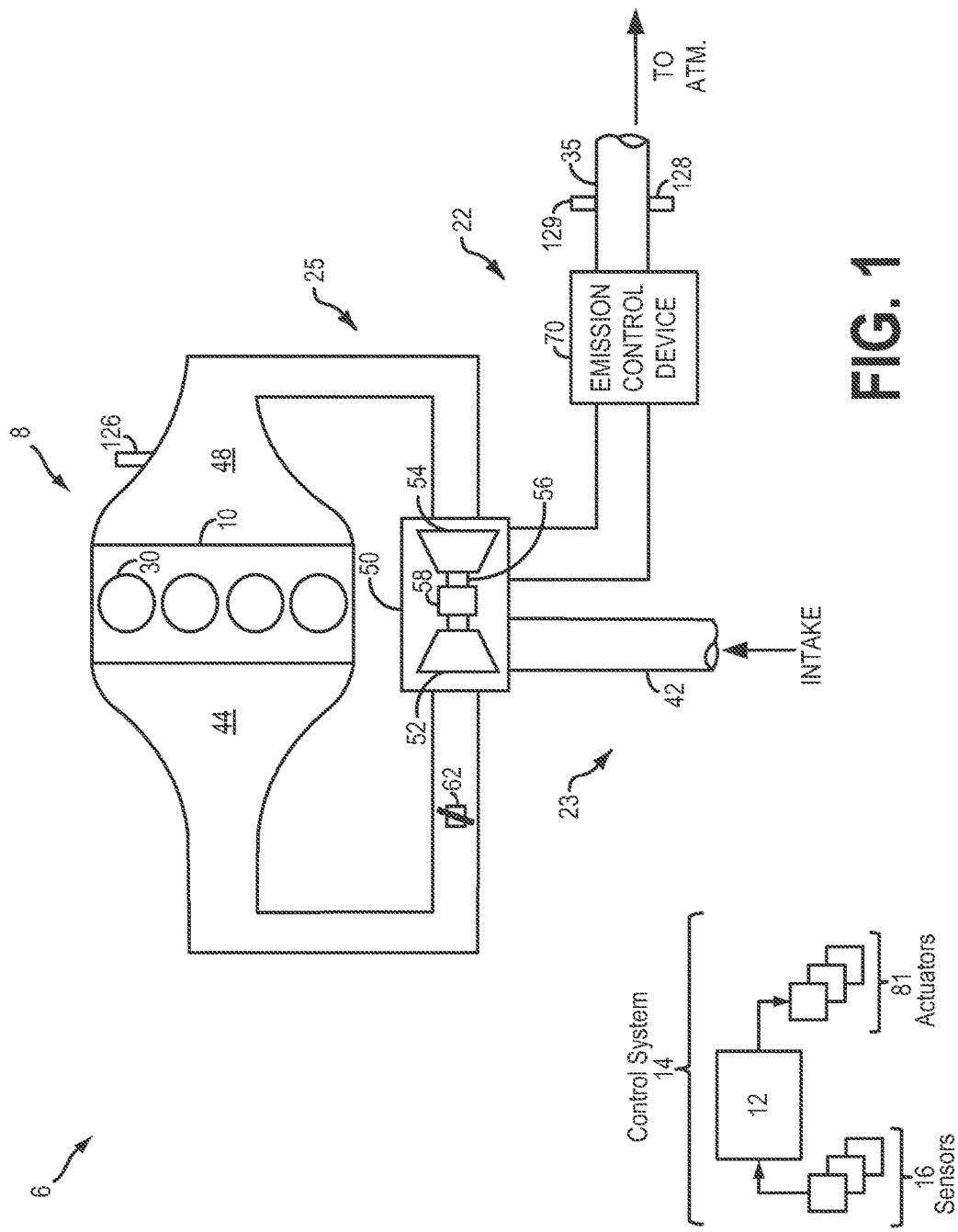
FIG. 1 is a schematic depiction of an example vehicle system including a turbocharger in accordance with the present disclosure.

FIG. 1 shows a schematic depiction of a vehicle system 6. The vehicle system 6 includes an engine system 8 coupled to an exhaust after-treatment system 22. The engine system 8 may include an engine 10 having a plurality of cylinders 30. Engine 10 includes an engine intake 23 and an engine exhaust 25. Engine intake 23 may include a throttle 62 fluidly coupled to an engine intake manifold 44 via an intake passage 42. The engine exhaust 25 may include an exhaust manifold 48 eventually leading to an exhaust passage 35 that routes exhaust gas to the atmosphere. Throttle 62 may be located in intake passage 42 downstream of a boosting device, such as turbocharger 50, or a supercharger. Turbocharger 50 may include a compressor 52, arranged between intake passage 42 and intake manifold 44. Compressor 52 may be at least partially powered by exhaust turbine 54, arranged between exhaust manifold 48 and exhaust passage 35. Compressor 52 may be coupled to exhaust turbine 54 via shaft 56. Compressor 52 may also be at least partially powered by an electric motor 58. In the depicted example, electric motor 58 is shown coupled to shaft 56. However, other suitable configurations of the electric motor may also be possible. In one example, the electric motor 58 may be operated with stored electrical energy from a system battery (not shown) when the battery state of charge is above a charge threshold. By using electric motor 58 to operate turbocharger 50, for example at engine start, an electric boost (e-boost) may be provided to the intake aircharge. In this way, the electric motor may provide a motor-assist to operate the boosting device. As such, once the engine has run for a sufficient amount of time (for example, a threshold time), the exhaust gas generated in the exhaust manifold may start to drive exhaust turbine 54. Consequently, the motor-assist of the electric motor may be decreased. That is, during turbocharger operation, the motor-assist provided by the electric motor 52 may be adjusted responsive to the operation of the exhaust turbine.

Engine exhaust 25 may be coupled to exhaust after-treatment system 22 along exhaust passage 35. Exhaust after-treatment system 22 may include one or more emission control devices 70, which may be mounted in a close-coupled position in the exhaust passage 35. One or more emission control devices 70 may include a three-way catalyst, lean NOx filter, SCR catalyst, etc. The catalysts may enable toxic combustion by-products generated in the exhaust, such as NOx species, unburned hydrocarbons, carbon monoxide, etc., to be catalytically converted to less-toxic products before expulsion to the atmosphere. However, the catalytic efficiency of the catalyst may be largely affected by the temperature of the exhaust gas. For example, the reduction of NOx species may require higher temperatures than the oxidation of carbon monoxide. Unwanted side reactions may also occur at lower temperatures, such as the production of ammonia and $N_2O$ species, which may adversely affect the efficiency of exhaust treatment, and degrade the quality of exhaust emissions. Thus, catalytic treatment of exhaust may be delayed until the catalyst(s) have attained a light-off temperature. Exhaust after-treatment system 22 may also include hydrocarbon retaining devices, particulate matter retaining devices, and other suitable exhaust after-treatment devices (not shown). It will be appreciated that other components may be included in the engine such as a variety of valves and sensors.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128, and pressure sensor 129 (located downstream of emission control device 70). Other sensors such as pressure, temperature, air/fuel ratio, and composition sensors may be coupled to various locations in the vehicle system 6. Example actuators 81 may include fuel injectors (not shown), a variety of valves, a pump, and throttle 62. The control system 14 may include a controller 12. The controller may receive input data from the various sensors 16, process the input data, and trigger the actuators 81 in response to the processed input data, based on instruction or code programmed therein, corresponding to one or more routines.

Figure 2:
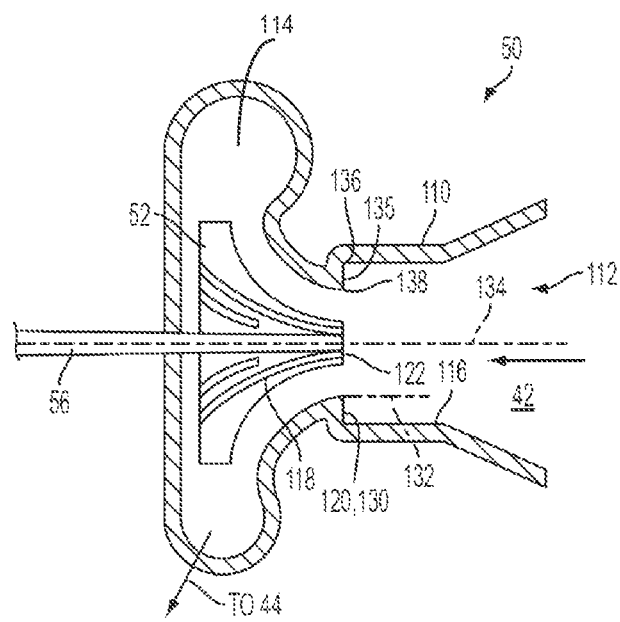
FIG. 2 is a sectional view of portions of an example turbocharger that may be used with vehicle systems in accordance with the present disclosure.

FIG. 2 is a sectional view of portions of an example turbocharger 50 in accordance with the present disclosure. The turbocharger 50 may include a casing 110 having an inlet end 112 and an outlet end 114. There may be a flow passage 42 within the casing 110 that may have a substantially continuous inner surface 116 and that may be configured to pass inlet air from the inlet end 112 to the outlet end 114. A compressor wheel 52 may be located in the casing 110 and may have at least one main blade 118. The compressor wheel 52 may be configured to rotate within the casing 110 to compress the inlet air. There may be a flow disrupting feature 120 on the casing 110 that may be configured to disrupt the continuity of the inner surface 116. The flow disrupting feature 120 may be located at, or in line axially with, a leading edge 122 of the at least one main blade 118. The flow disrupting feature 120 may be closed to upstream communication with the flow passage 42 except via the flow passage 42. Closed to upstream communication with the main flow path may refer to there being no flow path from the flow disrupting feature to an upstream location via any route other than via the flow passage.

The flow passage 42 may be substantially circular in cross section and the flow disrupting feature 120 may be a step 130 wherein the flow passage 42 abruptly decreases in diameter. In this way the effective cross-sectional area of the flow passage may be reduced. In the case of a cylindrical, or circular cross-sectional area the step may reduce the effective flow diameter of the flow passage 42 which may reduce the axial inlet flow and may also, or instead, increase the surge margin, and reduce whoosh.

Figure 3:
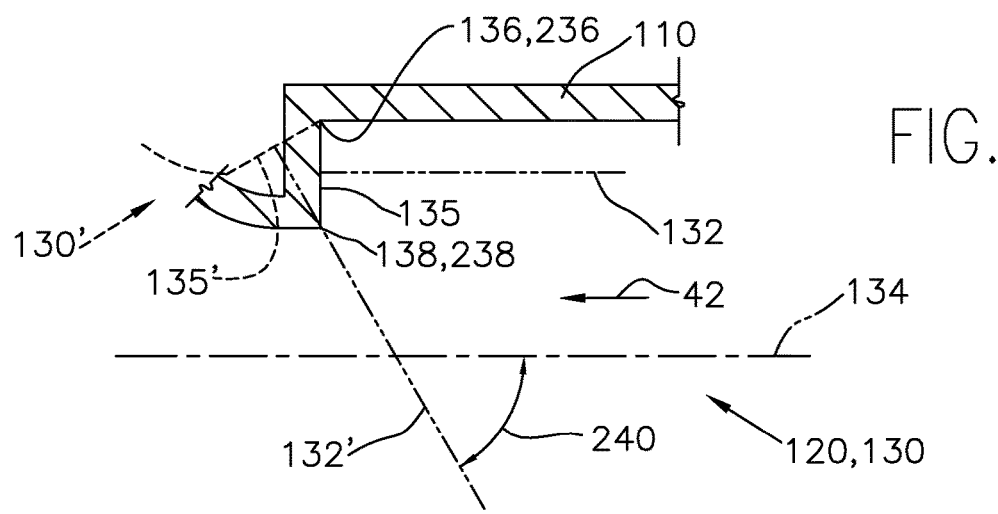
FIG. 3 is a zoomed in partial view of showing an example flow disrupting feature in accordance with the present disclosure.

FIG. 3 is a detailed view of a portion of the flow disrupting feature 120, i.e. the step 130, shown in FIG. 2 with portions of another example embodiment illustrated with dashed lines. The step 130 has a step face 135 which may be substantially annular in the case of a substantially cylindrical casing 110, and may have an outer diameter defining an inner corner 136 and an inner diameter defining an outer corner 138. The inner corner 136 may define, or be included in an upstream transitional portion 236 of the step 130, and the outer corner 138 may define, or be included in, a downstream transitional portion 238 of the step 130. A second example step face 135' is illustrated in dashed line angled relative to the first example step face 135.

Two lines 132, 132' are shown in phantom normal to the respective first example step face 135 and second example step face 135'. With some example embodiments the line 132 normal to the step face 135 may be parallel with a centerline 134 of the casing 110, or general direction of the flow passage 42. With other example embodiments such as with the example step face 135' a line 132' normal to the step face 135' may make an angle 240 with the center line 134 of the casing 110. Accordingly, in some cases the step face may be arranged at an angle with an incoming flow of inlet air. The angle 240 may be, for example, between 0 and 80 degrees. In some cases the angle 240 may be approximately 45 degrees, or negative.

Figure 4:
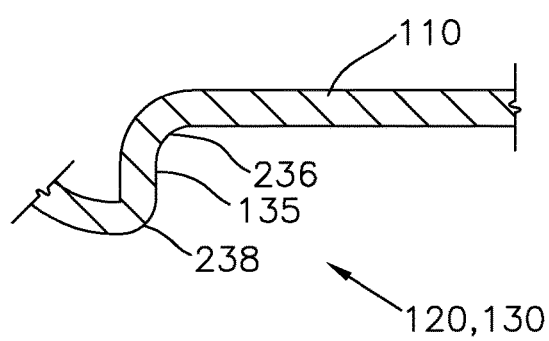
FIG. 4 is a zoomed in partial view of showing another example flow disrupting feature in accordance with the present disclosure.

In various other examples the flow disruptive feature 120 may include an upstream transitional portion 236 and/or a downstream transitional portion 238 shaped in various ways. FIG. 4 is a detailed view of an example flow disrupting feature 120, embodied as a variation of step 130 having an upstream transitional portion 236 and the downstream transitional portion 238 having filleted corners. The step 130 may include a step face 135 oriented substantially toward the direction of incoming flow 42 as shown, or angled differently as discussed below.

Figure 5:
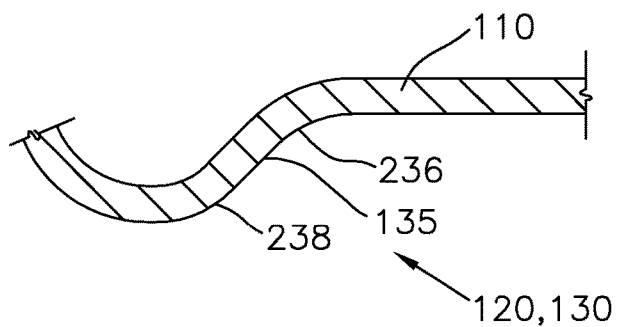
FIG. 5 is a zoomed in partial view of showing another example flow disrupting feature in accordance with the present disclosure.

FIG. 5 illustrates another example flow disruptive feature 120 wherein one or both of the upstream and downstream transitional portions are spline surfaces. The step 130 may include a continuously curved surface that transitions from an upstream position to a downstream position. The step face 135 may be oriented at an angle with the direction of the incoming flow 42.

In some embodiments the upstream and downstream transitional portions may include portions that may reverse direction in that they may, for example, begin to extend downstream and then extend upstream at least for a short distance. Examples are illustrated in FIGS. 6 and 7.

Figure 6:
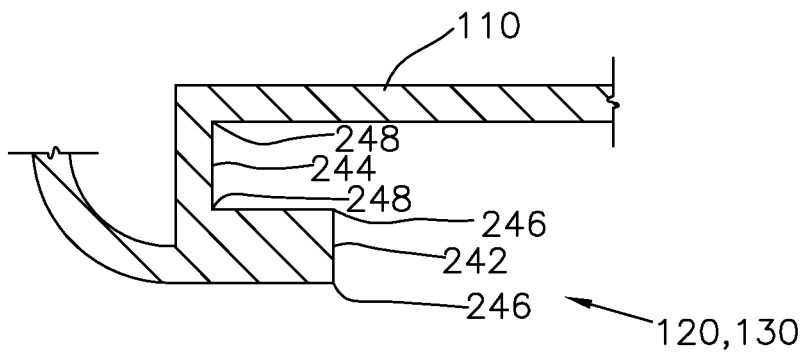
FIG. 6 is a zoomed in partial view of showing another example flow disrupting feature in accordance with the present disclosure.

FIG. 6 is a detailed view of another example flow disrupting feature 120, embodied as a step 130. The step 130 may include a protruded element 242 and a recessed element 244. The protruded element 242 may include external corners 246 and the recessed element may include internal corners 248. In some cases, one or more of the external corners 246 and internal corners 248 may be square corners as illustrated although variations are possible.

Figure 7:
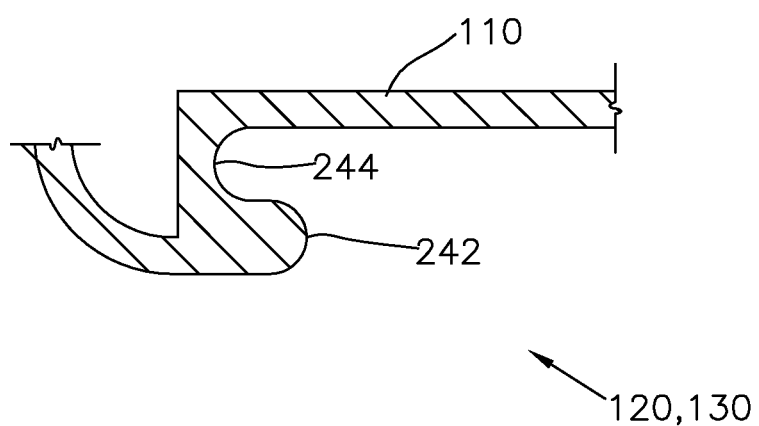
FIG. 7 is a zoomed in partial view of showing another example flow disrupting feature in accordance with the present disclosure.

FIG. 7 is a detailed view of another example of the flow disrupting feature 120, embodied as a step 130. In this example one or more of the protruded element 242 and the recessed element 244 may be, or may include, surfaces that are configured to transition smoothly from adjacent surfaces. For example the corners may be filleted or spline surfaces. With some examples the protruded element and the recessed element may be substantially cylindrical elements, and may be toroid shaped.

As seen in FIG. 2, some embodiments may provide a turbocharger 50 that may include a casing 110. A compressor wheel 52 may be located in the casing 110 and may have main blades 118 and may be configured to rotate within the casing 110 to compress inlet air. A flow passage 42 within the casing 110 may have an inner surface 116 configured to pass the inlet air from an inlet end 112 to an outlet end 114. Embodiments may include a step 130 in the inner surface 116 abruptly reducing a cross-sectional area of the flow passage 42 located substantially in line with a leading edge 122 of the main blades 118. The step may have a step face 135 that may form an angle of between 10 and 170 degrees with a central axis 134 of the flow passage 42.

The step 130 may include an annular surface, or face 135, having an outer diameter forming a circular inner corner 136 with an upstream portion of the inner surface and an inner diameter forming a circular outer corner 138 with a downstream portion of the inner surface 116. The step may be in an area of the flow passage 42 that may be closed to upstream communication with the flow passage 42 except via the flow passage 42.

Figure 8:
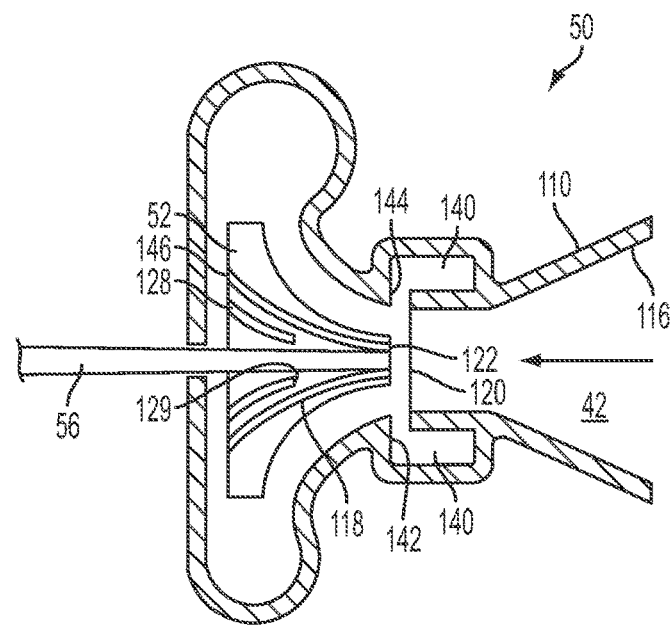
FIG. 8 is a sectional view of portions of another example turbocharger that may be used with vehicle systems in accordance with the present disclosure.

FIG. 8 is a sectional view of portions of another example turbocharger 50 in accordance with the present disclosure. The turbocharger 50 may include a compressor wheel 52 located in a casing 110. The compressor wheel 52 may have main blades 118 and may be configured to rotate within the casing 110 to compress inlet air. A passage 42 may be located within the casing 110 which may be configured to pass inlet air, and which may have a substantially continuous inner surface 116. The turbocharger 50 may also have an annular feature 120 disrupting the continuity of the inner surface 116 located at a leading edge 122 of the main blades 118. The passage may be closed to upstream communication at the annular feature 120 except via the passage 42.

The compressor wheel 52 may also have splitter blades 128 and/or other features. Each splitter blade 128 may have a leading edge 129 that may be downstream relative to the leading edge 122 of the main blades 118.

In various embodiments the annular feature 120 may be a resonance chamber 140. The resonance chamber 140 may be sized and shaped to reduce a whoosh noise generated by the compressor wheel 52. The resonance chamber may be open to the passage 42 only via a channel 142 formed in the substantially continuous inner surface 116. The whoosh noise may include one or more sounds of a frequency "f". The channel 142 and the resonance chamber 140 may be sized according the formula f=[C/2Pi]*sqrt[area of an opening of channel)/((volume of the resonance chamber)(longitudinal length of the resonance chamber))], where C is the speed of sound.

The description "at a leading edge of the main blades" may refer to a preselected maximum distance at which the flow disrupting feature may be located from the leading edge of the main blade, or blades. The preselected maximum distance may be measured in absolute units, or measured relative to a reference distance between other points of the turbocharger arrangement described herein. An example reference distance may be the longitudinal distance from the leading edge to a trailing edge of the main blade.

In some examples a trailing edge 144 of the flow disrupting feature may be located substantially in line in a flow direction with the leading edge 122 of the at least one main blade 118. In some examples a majority of the flow disrupting feature 120 may be located upstream from the leading edge 122 of the main blades 118. The trailing edge 144 of the flow disrupting feature 120 may be located a distance from the leading edge 122 of the main blades 118. In some cases at least a portion of the flow disrupting feature 120 may be located upstream from the leading edge of the main blades 118.

In some examples the flow disrupting feature may be a resonator 140 having a resonator opening 142, the resonator opening may have a trailing edge 144 located substantially in line longitudinally with the leading edge 122 of the compressor main blades 118.

The flow disrupting feature 120 may be an annular channel in the inner surface of the flow passage and the channel may be open to a chamber. The flow disrupting feature may include a channel and a chamber wherein the channel is formed into the inner surface of the flow passage and the chamber is open to the flow passage only via the channel. The phrase "wherein the chamber is open only to the flow passage via the channel" may be interpreted to mean that the chamber is bounded, or closed everywhere except at the channel wherein it is open to the flow passage.

In some examples the channel and chamber may be formed as a single piece, and may be for example a molded piece. In some examples the channel and chamber may be two or more pieces. In some examples the channel may be cut onto a flow passage formed, for example, as a tube, or conduit, or the like, and the chamber may be a volume added outside of the flow, or main flow passage over the channel.

In some examples the channel and the chamber may have dimensions that are sized relative to a predetermined frequency 'f' characteristic of a whoosh noise emitted by the compressor wheel in accordance with the formula:

$$f=[C/2\pi]*\text{sqrt}[s/VL]$$

where:
C is the speed of sound;
s=the area of the channel=$2\pi rl$;
  where:
    r=the radius of the inner passage;
    l=a longitudinal length, or a width of the channel;
V is the volume of chamber determined by V=$\pi(R_o^2-R_i^2)*L$:
  where $R_o$ is the outer radius of the chamber as measured from a central axis of the flow passage;
  where $R_i$ is the inner radius of the chamber as measured from the central axis of the flow passage; and
L is the length of the chamber as measured in the longitudinal direction.

The speed of sound considered in the design considerations in accordance with various embodiments may be the speed of sound in the environment of the turbocharger. For example, the size and/or relative proportions of the components of the channel and chamber may be determined taking into consideration the particular environment of the turbocharger, for example the temperature and/or pressure in and/or around the air inlet and/or the engine.

Various embodiments may provide a turbocharger including a casing defining a flow passage configured to pass inlet air from an inlet end to an outlet end; a compressor wheel located in the casing having one or more main blades and configured to rotate within the casing to compress the inlet air; and a substantially cylindrical channel defined in the flow passage having a channel trailing edge located substantially in line axially with a leading edge of the one or more main blades. The chamber may be substantially toroidally shaped and may be located external to the flow passage in a radial direction.

Figure 9:
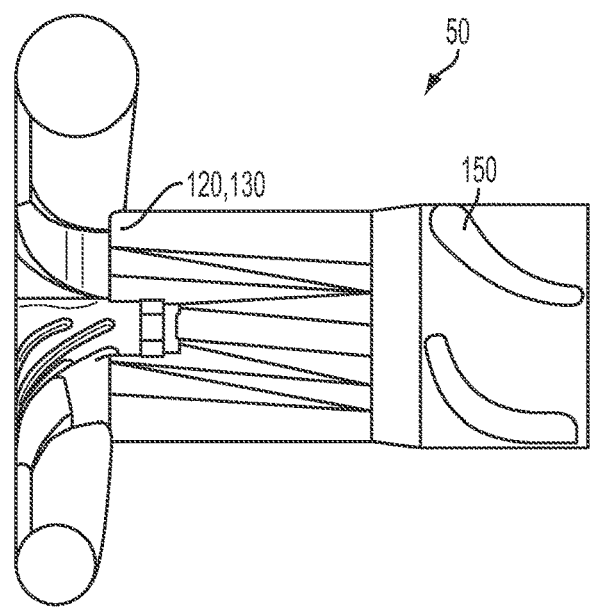
FIG. 9 is a partial side view of portions of a turbocharger in accordance with the present disclosure where selected elements internal to a flow passage are illustrated.

FIG. 9 is a partial side view of portions of another example turbocharger 50. Selected elements internal to a flow passage are shown unobstructed by a flow passage external wall for illustration purposes. The figure illustrates an example embodiment wherein a flow disrupting feature 120 in accordance with the present disclosure is embodied as a step 130. The figure also shows an example wherein a swirl generating device 150 may be positioned upstream from the step 130 configured to impart a swirl to a flow of the inlet air.

Figure 12:
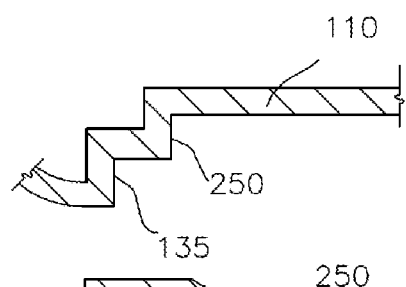

FIGS. 10-14 illustrate various example embodiments of a turbocharger in accordance with the present disclosure wherein the annular feature 120, 130 may include a leading edge surface 250 that may be configured to do one or more of: splay radially outwardly in a direction away from a central axis 134 of the casing 110 (FIG. 10); splay radially inwardly in a direction toward the central axis 134 of the casing 110 (FIG. 11); and extend radially inwardly in a direction toward the central 134 of the casing 110 (FIG. 12).

Figure 13:
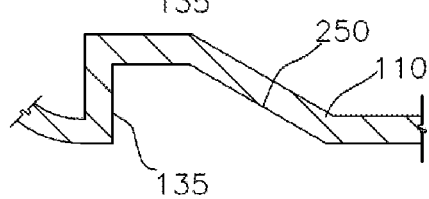
Figure 14:
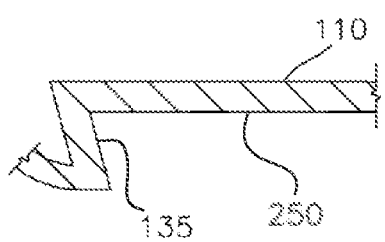

The annular feature 120, 130 may also include a trailing edge step face 135 which may abruptly reduce the cross section of the passage 42. The leading edge surface 250 may be one or more of: contiguous with the step face 135 (FIGS. 10, 11); adjacent to the step face; and spaced apart from the step face (FIGS. 11-14). The leading edge face 250 may form an upstream side of an annular channel 252, and the step face 135 may form a downstream edge of the annular channel (FIGS. 13 and 14).

Figure 10:
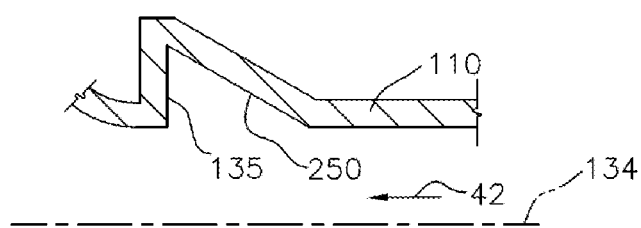
FIG. 10-14 are sectional views of still more examples of portions of a turbocharger wherein various example angles are illustrated.
Figure 11:
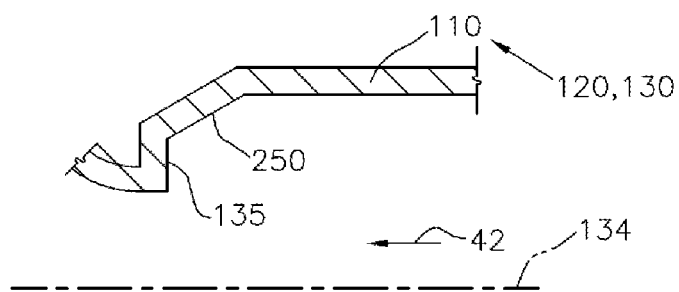

In some cases the leading edge face 250 may form an acute angle upstream from, or leading up to the step face 135 (FIG. 10). In some cases the leading edge face 250 may form an obtuse angle upstream from, or leading up to the step face 135 (FIG. 11); and in some cases the leading edge face 250 may form a right angle upstream from, or leading up to the step face 135 (FIG. 12). Further, in some cases the leading edge face 250 may form a negative angle upstream from, or leading up to the step face 135 (FIG. 14).

Figure 15:
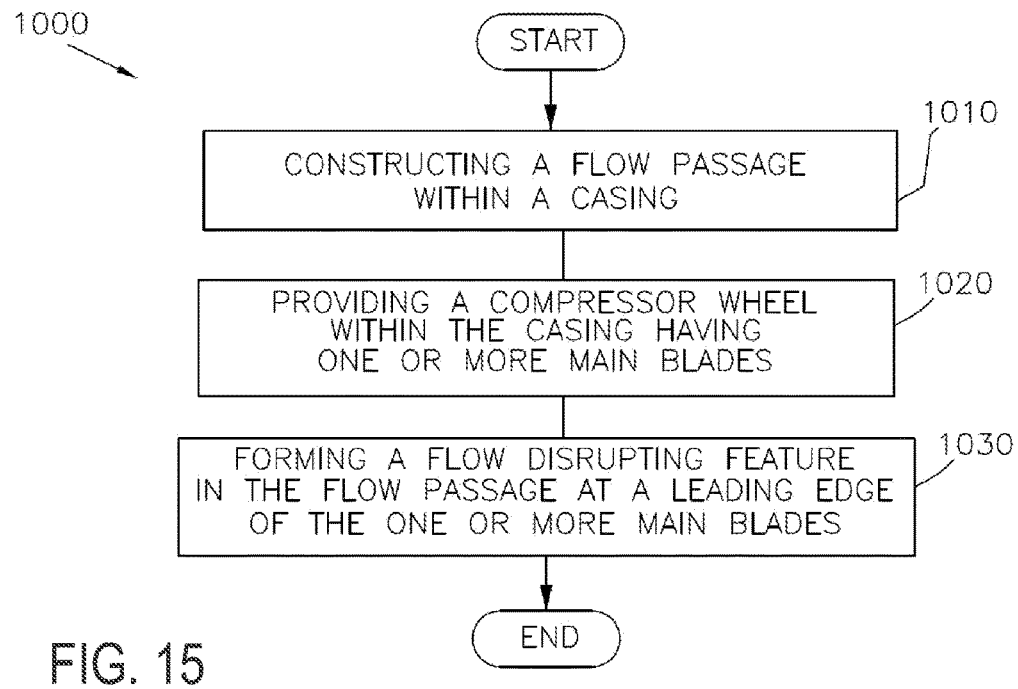
FIG. 15 is a flow diagram illustrating an example method of forming a turbocharger in accordance with the present disclosure.

FIG. 15 is a flow diagram illustrating an example method 1000 of forming a turbocharger. The method 1000 may include, at 1010, constructing a flow passage within a casing. The method 1000 may also include, at 1020, providing a compressor wheel within the casing having one or more main blades. The method 1000 may include, at 1030, forming a flow disrupting feature in the flow passage at a leading edge of the one or more main blades.

Figure 16:
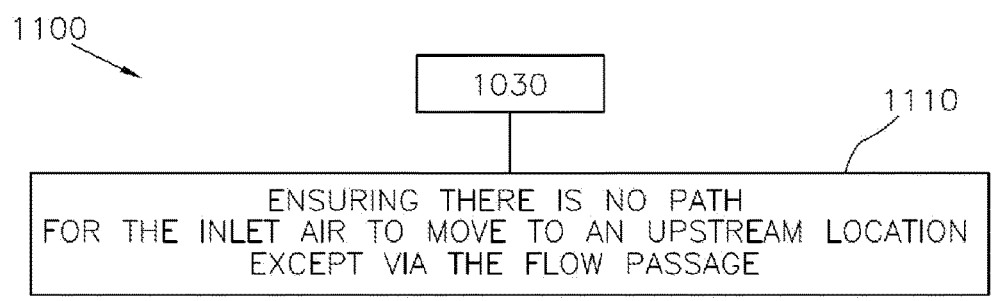
FIGS. 16-19 are flow diagrams illustrating an example modification of the method illustrated in FIG. 15.

FIG. 16 is another flow diagram illustrating a modification of the method 1000 illustrated in FIG. 15. The modified method 1100 may include an additional element, for example, at 1110, ensuring there is no path for the inlet air to move to an upstream location except via the flow passage.

Figure 17:
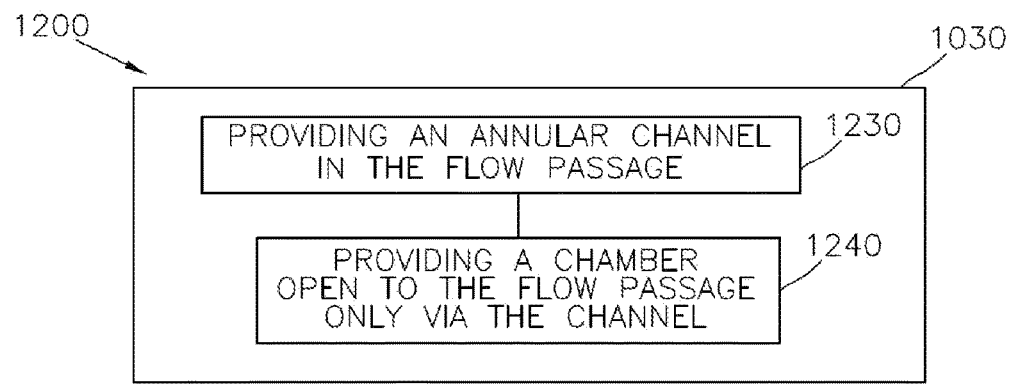

FIG. 17 is another flow diagram illustrating a modification of the method 1000 illustrated in FIG. 15. The modified method 1200 may include a modification wherein the forming a flow disrupting feature 1030 may include, at 1230, providing an annular channel in the flow passage, and, at 1240, providing a chamber open to the flow passage only via the channel.

Figure 18:
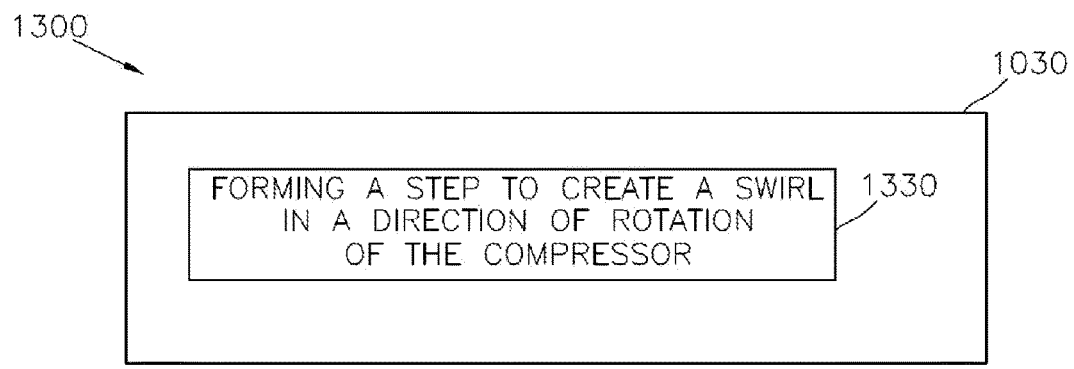

FIG. 18 is another flow diagram illustrating a modification of the method 1000 illustrated in FIG. 15. The modified method 1300 may include a modification wherein the forming a flow disrupting feature 1330 may include, at 1330, forming a step to create a swirl in a direction of rotation of the compressor.

Figure 19:
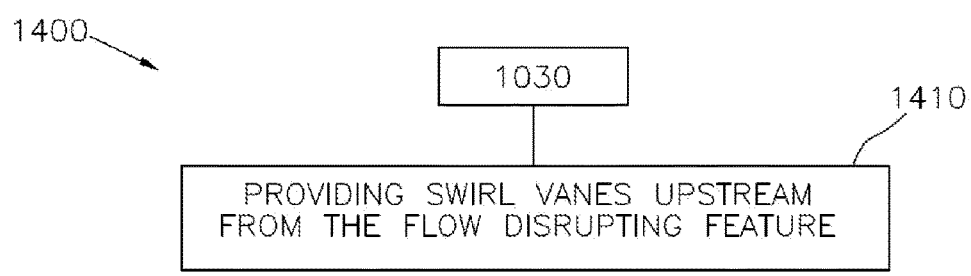

FIG. 19 is another flow diagram illustrating a modification of the method 1000 illustrated in FIG. 15. The modified method 1400 may include additional element, for example, at 1410, providing swirl vanes upstream from the flow disrupting feature.

It will be understood that the engine system 8 is shown, only for the purpose of example, and that the systems and methods described herein may be implemented in or applied to any other suitable engine having any suitable components and/or arrangement of components.

The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A turbocharger comprising:
a casing having an inlet end and an outlet end;
a flow passage within the casing having a substantially continuous inner surface and configured to pass inlet air from the inlet end to the outlet end, the flow passage having a central axis;
a compressor wheel located in the casing downstream of the flow passage and having at least one main blade, the at least one main blade being a most upstream blade of the compressor wheel, and configured to rotate within the casing and about the central axis to compress the inlet air; and
an annular flow disrupting feature on the casing in a region of the flow passage configured to disrupt the continuity of the inner surface located at a leading edge of the at least one main blade, where the flow disrupting feature is closed to upstream communication with the flow passage except via the flow passage, where the flow disrupting feature is an angled step in the inner surface, and where a trailing edge of the flow disrupting feature is located proximate to and at or upstream of, relative to a direction of the central axis, the leading edge of the at least one main blade.

2. The turbocharger of claim 1, wherein the angled step includes an upstream transitional portion and a downstream transitional portion, the downstream transitional portion proximate to the leading edge of the at least one main blade and wherein there are no walls arranged between the leading edge of the at least one main blade and the angled step, in a direction perpendicular to the central axis.

3. The turbocharger of claim 2, wherein the angled step includes a step face that extends between the upstream transitional portion and the downstream transitional portion.

4. The turbocharger of claim 1, wherein the flow disrupting feature is located upstream from the leading edge of the at least one main blade.

5. The turbocharger of claim 1, wherein the trailing edge of the flow disrupting feature is located a distance from and upstream from the leading edge of the at least one main blade, the distance being a longitudinal distance arranged in the direction of the central axis.

6. The turbocharger of claim 1, wherein the angled step includes a step face that is angled inward toward the central axis and wherein the inner surface is continuous from a location upstream of the compressor wheel and flow disrupting feature to a location of the trailing edge of the flow disrupting feature.

7. The turbocharger of claim 6, wherein the angled step includes an upstream transitional portion and a downstream transitional portion and the step face is positioned between the upstream transitional portion and the downstream transitional portion.

8. The turbocharger of claim 7, wherein one or both of the upstream transitional portion and the downstream transitional portion include filleted corners and wherein the upstream transitional portion is arranged upstream of the compressor wheel.

9. The turbocharger of claim 7, wherein one or both of the upstream and downstream transitional portions are spline surfaces.

10. The turbocharger of claim 6, wherein the step face is arranged at an angle with an incoming flow of inlet air.

11. The turbocharger of claim 10, wherein the angle is between 0 and 80 degrees.

12. The turbocharger of claim 10, wherein the angle is approximately 45 degrees.

13. The turbocharger of claim 1, wherein the angled step includes a continuously curved surface that transitions from an upstream position to a downstream position.

14. The turbocharger of claim 1, wherein the angled step reduces a cross-sectional area of the flow passage, upstream of the leading edge of the at least one main blade.

15. The turbocharger of claim 1, wherein the flow passage is substantially circular in cross section and wherein the flow passage decreases in diameter at the angled step.

16. A turbocharger comprising:
a casing having a central axis;
a compressor wheel located in the casing having main blades and rotatable within the casing about the central axis to compress inlet air, the main blades being most upstream blades of the compressor wheel;
a flow passage within the casing positioned upstream of the compressor wheel and having an inner surface configured to pass the inlet air from an inlet end to an outlet end; and
an annular step in the inner surface reducing a cross-sectional area of the flow passage, the annular step located proximate to and at or upstream of a leading edge of the main blades, in a direction of the central axis, where the annular step includes a step face angled relative to the central axis and a face of the leading edge of the main blades, the face of the leading edge of the main blades perpendicular to the central axis, the leading edge of the main blades being a most upstream edge of the main blades, relative to flow through the flow passage along the direction of the central axis.

17. The turbocharger of claim 16, wherein the step face forms an angle of between 10 and 90 degrees with the central axis and where the annular step is a continuously curved surface that transitions from an upstream position to a downstream position.

18. The turbocharger of claim 16, wherein the annular step is in an area of the flow passage that is closed to upstream communication with the flow passage except via the flow passage, wherein the annular step reduces the cross-sectional area of the flow passage in a downstream direction, and wherein the main blades are arranged more upstream, relative to flow through the flow passage from the inlet end to the outlet end, in the direction of the central axis, on the compressor wheel than remaining blades of the compressor wheel.

19. A turbocharger comprising:
a compressor wheel located in a casing having main blades and configured to rotate within the casing about a central axis to compress inlet air, the main blades being most upstream blades of the compressor wheel;
a passage positioned upstream of the compressor wheel within the casing configured to pass inlet air and having a substantially continuous inner surface; and
an annular feature disrupting the continuity of the inner surface, the annular feature located proximate to and at or upstream of, in a direction of the central axis, a leading edge of the main blades, a face of the leading edge of the main blades arranged perpendicular to the central axis, where the annular feature includes a step face in the inner surface that splays radially inwardly in the direction toward the central axis.

20. The turbocharger of claim 19, wherein the passage is closed to upstream communication at the annular feature except via the passage and where the step face extends between an upstream transitional portion and a downstream transitional portion of the annular feature, wherein the upstream transitional portion, the downstream transitional portion, and the step face from a continuously curved surface, and wherein a trailing edge of the annular feature does not extend past the leading edge of the main blades, in the direction of the central axis.

* * * * *